United States Patent
Sharma et al.

(10) Patent No.: US 11,755,745 B2
(45) Date of Patent: Sep. 12, 2023

(54) SYSTEMS AND METHODS FOR MONITORING ATTACKS TO DEVICES

(71) Applicant: Johnson Controls Technology Company, Auburn Hills, MI (US)

(72) Inventors: Nidhi Sharma, Pune (IN); Sreekesh Sreelal, Pune (IN); Pushpendra Singh Kharsan, Pune (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 86 days.

(21) Appl. No.: 16/774,513

(22) Filed: Jan. 28, 2020

(65) Prior Publication Data

US 2020/0242255 A1 Jul. 30, 2020

(30) Foreign Application Priority Data

Jan. 29, 2019 (IN) .............................. 201921003516

(51) Int. Cl.
| | |
|---|---|
| *G06F 21/57* | (2013.01) |
| *G16Y 30/10* | (2020.01) |
| *G06F 21/56* | (2013.01) |
| *G06F 21/55* | (2013.01) |

(52) U.S. Cl.
CPC .......... *G06F 21/577* (2013.01); *G06F 21/554* (2013.01); *G06F 21/565* (2013.01); *G16Y 30/10* (2020.01)

(58) Field of Classification Search
CPC .......... G06F 21/50–577; G06F 21/577; G06F 21/554; G06F 21/565; G16Y 30/10
See application file for complete search history.

(56) References Cited

U.S. PATENT DOCUMENTS

| | | | |
|---|---|---|---|
| 10,887,296 B2* | 1/2021 | Kobres | H04L 63/102 |
| 10,891,140 B1* | 1/2021 | Levin | G06F 9/45533 |
| 10,922,068 B1* | 2/2021 | Radjabi | G06F 13/4221 |
| 2007/0038891 A1* | 2/2007 | Graham | G06F 11/0745 714/28 |
| 2009/0198842 A1* | 8/2009 | Basavaraju | G06F 9/4411 710/16 |
| 2013/0326614 A1* | 12/2013 | Truskovsky | H04W 12/37 726/19 |
| 2015/0268952 A1* | 9/2015 | Ponsini | G06F 8/65 717/168 |
| 2016/0063281 A1* | 3/2016 | Kahana | G06F 21/71 726/27 |
| 2017/0177245 A1* | 6/2017 | Gonzalez Diaz | G06F 21/57 |
| 2019/0121886 A1* | 4/2019 | Shukla | G06F 16/2365 |

* cited by examiner

*Primary Examiner* — Shanto Abedin
*Assistant Examiner* — Alan L Kong
(74) *Attorney, Agent, or Firm* — Foley & Lardner LLP

(57) ABSTRACT

A method includes storing a golden copy of a device tree binary of a system in a trusted execution environment, identifying whether one or more parameters of a running copy of a device tree binary of the system are different from corresponding parameters of the golden copy by comparing the running copy with the golden copy, and performing a corrective action responsive to an indication that at least one of the one or more parameters of the running copy are different from the corresponding parameters of the golden copy.

19 Claims, 2 Drawing Sheets

SYSTEMS AND METHODS FOR MONITORING ATTACKS TO DEVICES

CROSS-REFERENCE TO RELATED PATENT APPLICATIONS

The present application claims priority to and the benefit of Indian Provisional Application No. 201921003516, filed Jan. 29, 2019, which is incorporated herein by reference in its entirety.

BACKGROUND

Internet-of-Things (IoT) devices have been actively developed because researchers are moving towards defining the world via intelligent IoT devices. However, along with the popularity of IoT devices, IoT devices may be subjected to security breaches, e.g., cyberattacks. While some prevention techniques have been proposed to authenticate and control the devices, the existing IoT devices are not entirely satisfactory in terms of being free from security attacks.

SUMMARY

One implementation of the present disclosure is a method that includes storing a golden copy of a device tree binary of a system in a trusted execution environment, identifying whether one or more parameters of a running copy of a device tree binary of the system are different from corresponding parameters of the golden copy by comparing the running copy with the golden copy, and performing a corrective action responsive to an indication that at least one of the one or more parameters of the running copy are different from the corresponding parameters of the golden copy.

In some embodiments, the method further includes decrypting the device tree binary of the system. In some embodiments, the device tree binary is a data structure describing one or more hardware components of the system.

In some embodiments, performing the corrective action includes at least one of quarantining a component of the system associated with the one or more parameters, evaluating each of the one or more parameters of the running copy identified as different from the corresponding parameters of the golden copy, or notifying a user of the system.

In some embodiments, the method further includes generating the running copy of the device tree binary.

In some embodiments, generating the running copy of the device tree binary further includes recording one or more parameters associated with one or more components of the system. In some embodiments, the one or more parameters are presented in a kernel pseudo file.

In some embodiments, the method further includes receiving the running copy of the device tree binary from a non-trusted execution environment.

In some embodiments, the method further includes determining that a timer has been attacked based on an indication that the running copy of the device tree binary has not been generated or received before the timer expired.

Another implementation of the present disclosure is a system for detecting an attack to an internet-of-things enabled device. The system includes one or more memory devices having instructions stored thereon that, when executed by one or more processors, cause the one or more processors to perform operations including loading an operating system in a trusted execution environment, wherein at least part of the operating system is used as a root of trust, storing a golden copy of a device tree binary of the system, identifying whether one or more parameters of a running copy of a device tree binary of the system are different from corresponding parameters of the golden copy by comparing the running copy with the golden copy, and performing a corrective action responsive to an indication that at least one of the one or more parameters of the running copy are different from the corresponding parameters of the golden copy.

In some embodiments, the operations further include decrypting the device tree binary of the system. In some embodiments, the device tree binary is a data structure describing one or more hardware components of the system.

In some embodiments, performing the corrective action includes at least one of quarantining a component of the system associated with the one or more parameters, evaluating each of the one or more parameters of the running copy identified as different from the corresponding parameters of the golden copy, or notifying a user of the system.

In some embodiments, the operations further include generating the running copy of the device tree binary.

In some embodiments, generating the running copy of the device tree binary further includes recording one or more parameters associated with one or more components of the system. In some embodiments, the one or more parameters are presented in a kernel pseudo file.

In some embodiments, the operations further include receiving the running copy of the device tree binary from a non-trusted execution environment.

In some embodiments, the operations further include determining that a timer has been attacked based on an indication that the running copy of the device tree binary has not been generated or received before the timer expired.

Yet another implementation of the present disclosure is a method that includes loading an operating system in a trusted execution environment, storing a golden copy of a device tree binary of the system, initiating a timer with a randomly generated period of time, determining whether a running copy of a device tree binary of the system is received or generated before the timer expires, and performing, based on determination that the running copy is not received or generated before the timer expires, a corrective action.

In some embodiments, the method further includes identifying whether one or more parameters of the running copy of a device tree binary of the system are different from corresponding parameters of the golden copy by comparing the running copy with the golden copy, and performing a corrective action responsive to an indication that at least one of the one or more parameters of the running copy are different from the corresponding parameters of the golden copy.

In some embodiments, performing the corrective action includes at least one of quarantining a component of the system associated with the one or more parameters, evaluating each of the one or more parameters of the running copy identified as different from the corresponding parameters of the golden copy, or notifying a user of the system.

In some embodiments, the method further includes decrypting the device tree binary of the system. In some embodiments, the device tree binary is a data structure describing one or more hardware components of the system.

In some embodiments, the method further includes generating the running copy of the device tree binary.

In some embodiments, the method further includes generating the running copy of the device tree binary further comprises recording one or more parameters associated with one or more components of the system, wherein the one or more parameters are presented in a kernel pseudo file.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Hardware platform providers have worked hard to provide a secure and isolated environment as a root of trust. Such a secure environment (e.g., Trustzone in ARM) has its own secure storage and other resources which are separate from main or primary processor. A separate operating system (OS) runs on secure processor in a high privilege mode, frequently known as trusted execution environment (TEE) that provides a root of trust when booting a device. During the boot process, TEE is considered as the root of trust as TEE loads a primary OS (BSP), but once the device is up and running, the control is with BSP only and TEE does not play much of a role.

The emphasis of TEE platform and other available solutions is on prevention of attacks, but to detect an attack can be equally important. Once the device is under attack, it is desirable to detect the attack as early as possible and prevent the attack from spreading further in the device and the network to which the device is connected. When a device is under attack, the attacker may try to utilize some unutilized resources or access the hardware resources from unauthorized user. The present disclosure provides various embodiments of systems and methods to dynamically detect or otherwise monitor whether a device is under attack.

Figure 1:
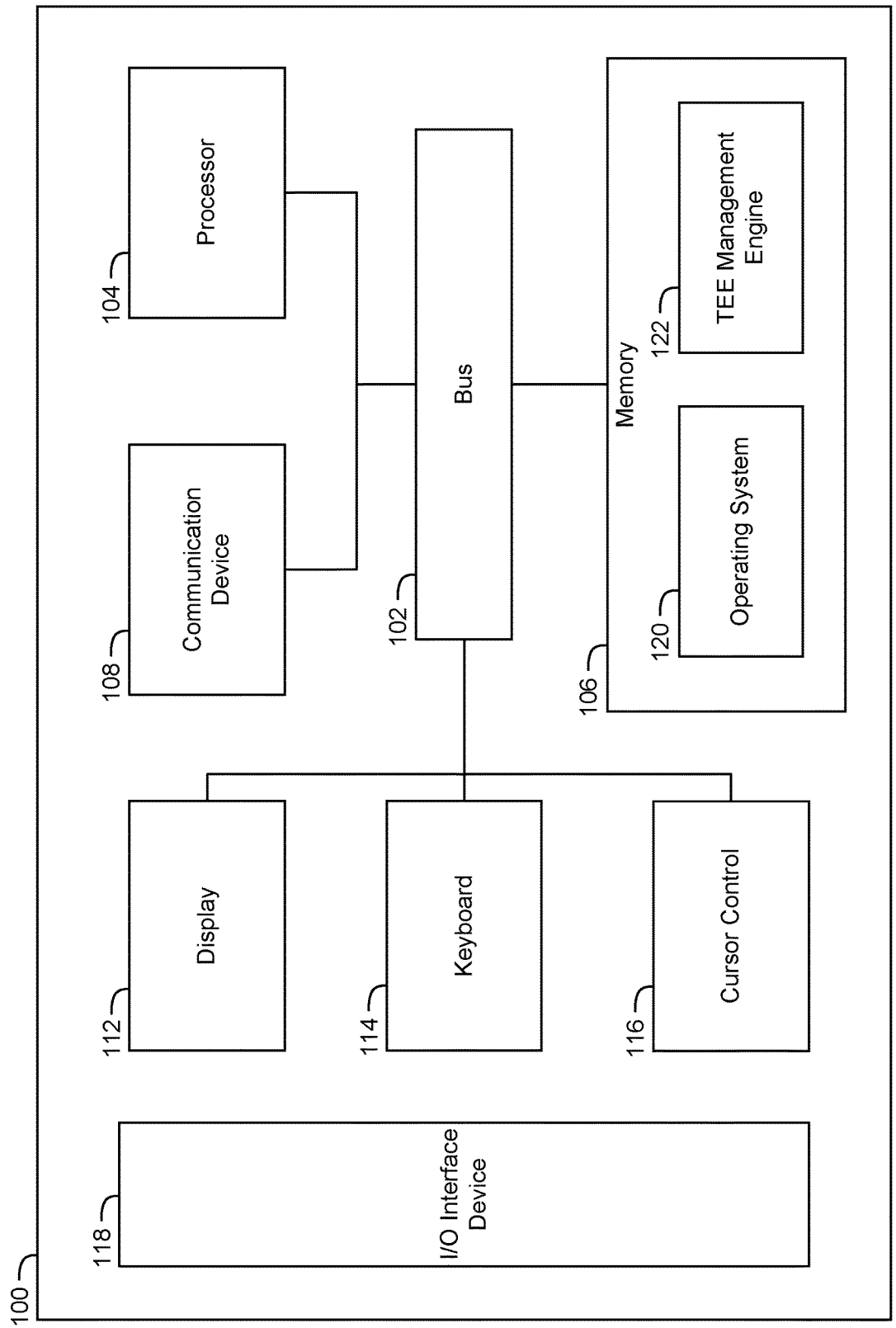
FIG. 1 a schematic diagram of a system that includes a trusted execution environment (TEE) management engine, according to some embodiments.

Referring to FIG. 1, a block diagram of a system 100 is depicted. System 100, which may be implemented as an IoT device, includes a bus 102 or other communications mechanism for communicating information between components of system 100. System 100 also includes a processor 104, operatively coupled to bus 102, for processing information and executing instructions or operations. Processor 104 may be any type of general or specific purpose processor. System 100 further includes a memory 106 for storing information and instructions to be executed by processor 104. Memory 106 can be comprised of any combination of random access memory ("RAM"), read only memory ("ROM"), static storage such as a magnetic or optical disk, or any other type of machine or computer-readable medium. System 100 further includes a communication device 108, such as a network interface card or other communications interface, to provide access to a network. As a result, a user may interface with system 100 directly, or remotely through a network or any other method. System 100 can be part of or be a computer, workstation, server, a mobile computing device, a smart device, or other computing device in some embodiments A computer-readable medium may be any available medium (e.g., a non-transitory medium) that can be accessed by processor 104. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 104 can also be operatively coupled via bus 102 to a display 112, such as a Liquid Crystal Display ("LCD"). Display 112 can display information to the user. A keyboard 114 and a cursor control device 116, such as a computer mouse, can also be operatively coupled to bus 102 to enable the user to interface with system 100. In some embodiments, system 100 can further include one or more input/output (I/O) interface devices 118 that are configured to communicatively couple system 100 to one or more peripheral devices through respective pins. Examples of such an I/O interface device 118 includes a general purpose input/output (GPIO) devices.

According to some embodiments of the present disclosure, memory 106 can store one or more software modules or engines that may provide respective functionalities when executed by processor 104. For example, memory 106 can include an operating system 120 and a trusted execution environment (TEE) management engine 122. Operating system 120 can provide an operating system functionality for system 100. TEE management engine 122 can provide functionality for implementing a TEE, as will be described in more detail below. In certain embodiments, TEE management engine 122 can include a number of modules or engines, where each module provides specific individual functionality for implementing a distributed TEE. System 100 can also be part of a larger system. Thus, system 100 can include one or more additional functional modules or engines to include the additional functionality.

In some embodiments, when system 100 is booted up (e.g., powered on, transitioned out of a low-power state, re-started), TEE management engine 122 can load the operating system 120 in a TEE and use at least a portion of the operating system 120 as a root of trust. Accordingly, TEE management engine 122 can decrypt a device tree binary or device tree blob (DTB) contained in the operating system 120. Such a DTB may be a data structure describing the hardware components of system 100 (e.g., bus 102, processor 104, memory 106, etc.). Further, according to some embodiments, in response to system 100 being booted up and DTB being decrypted, TEE management engine 122 can store a golden copy of the DTB. Having been decrypted and stored in the TEE, the golden copy of the DTB may be a master (e.g., known good) copy of the DTB. In some embodiments, the golden copy is stored in a partition (e.g., of a memory such as memory 122) or in another secure memory location. TEE management engine 122 may use the golden copy of the DTB to dynamically compare one or more running DTB to determine whether system 100 is being attacked, which shall be discussed in further detail below.

As described above, a DTB is a run-time data structure which represents one or more peripheral devices, processors, and buses of a system. A device tree source (DTS) is the human readable form of the DTB. A portion of an exemplary DTS is shown below.

```
/dts-v1/;
/ {
    compatible = "ti,am335x-bone", "ti,am33xx";
    model = "TI AM335x BeagleBone";
    aliases {
        serial0 = "/ocp/serial@44e09000";
        serial1 = "/ocp/serial@48022000";
    };
    memory {
        device_type = "memory";
        reg = <0x80000000 0x10000000>;
    };
    cpus {
        cpu@0 {
            compatible = "arm,cortex-a8";
            operating-points = <0xf4240 0x149970 0xc3500 ... ... >;
            clock-latency = <0x493e0>;
        }
    }
    ocp {
        compatible = "simple-bus";
        ti,hwmods = "l3_main";
        linux,phandle = <0x15>;
        phandle = <0x15>;
    }
    gpio-leds {
        compatible = "gpio-leds";
        pinctrl-names = "default";
        pinctrl-0 = <0x3>;
        led0 {
            label = "beaglebone:green:usr0";
            gpios = <0x5 0x15 0x0>;
            linux,default-trigger = "heartbeat";
            default-state = "off";
        }
    }
}
```

A DTS can include several branches each representing a component of the system such as, for example, the memory and buses from its root. Each branch may split further, for instance, to represent various peripherals connected to a particular bus, or for describing various pins within a GPIO (General Purpose Input-Output) peripheral.

During the boot up process of the operating system, the golden copy of DTB is used for probing and initializing various peripherals on board. In some embodiments, after being booted up, a copy of the DTB is maintained by system 100 (e.g., TEE management engine 122) which reflects the status of various peripheral devices (e.g., 112, 114, 116), processors (e.g., 104) and buses (e.g., 102). While system 100 is operating, TEE management engine 122 can further log, record, monitor or otherwise manage various parameters/status of each of the components of system 100 to generate (e.g., compile) a running DTB, or receive a running DTB from another component of system 100. For example, TEE management engine 122 may include a device tree compiler configured to use information (e.g., current status of the components of system 100) presented in a kernel pseudo file system (e.g., /pros and/or /sys) to generate a running DTB. In another example, system 100 (e.g., memory 106) may include an application logically located in a non-TEE environment that is configured to use a device tree compiler to generate a running DTB every random amount of period of time, and in response to the generation of a running DTB, send the running DTB to TEE management engine 122. In some embodiments, TEE management engine 122 can use such a running DTB to identify if any malicious program is trying to bring up an interface that has been disabled purposefully by comparing the running DTB with the golden copy of DTB. Based on the comparison, status changes of any of the peripherals/interfaces can be identified. TEE management engine 122 can further identify an attack occurring to TEE management engine 122 itself during normal operation of system 100. For example, if a timer of TEE management engine 122 is used by a legitimate process and a malicious process is able to disable the timer, an attack can occur.

Figure 2:
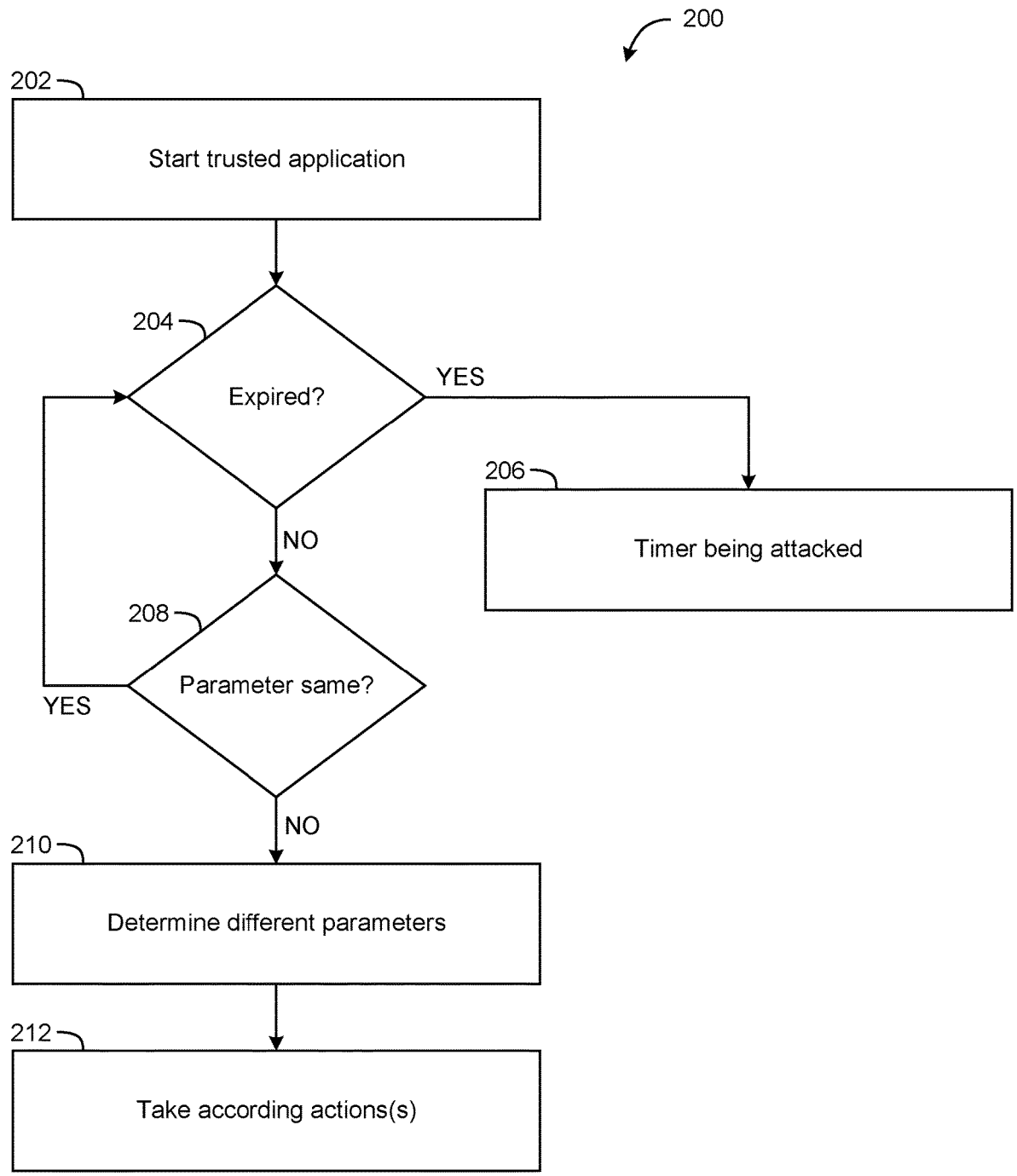
FIG. 2 is a flow chart of an example method for detecting an attack to the system of FIG. 1, according to some embodiments.

Referring to FIG. 2, a flow chart of a method 200 for detecting an attack to a system is depicted. In some embodiments, operations of the method 200 may be performed by one or more components of system 100. For purposes of discussion, the following embodiment of the method 200 will be described in conjunction with FIG. 1. The illustrated embodiment of the method 200 is merely an example. Therefore, it should be understood that any of a variety of operations may be omitted, re-sequenced, and/or added while remaining within the scope of the present disclosure.

The method 200 starts with operation 202 in which a trusted application is started. In some embodiments, TEE management engine 122 may start such a trusted application simultaneously with or subsequently to loading the DTB from operating system. The trusted application may be previously identified as "trusted" or "authenticated" for system 100 to perform in a TEE.

The method 200 continues to operation 204 in which TEE management engine 122 determines whether a timeout, corresponding to the trusted application, occurs. In some embodiments, when the trusted application is started, TEE management engine 122 may set a corresponding timer with a randomly generated period of time and subsequently initiate said timer. Setting the timer with a randomized period of time may be beneficial in mitigating attacks on the system. For example, a non-randomized time interval may be predictable to an attacker, in which case the attacker may attack the system and subsequently revert any changes before the timer expires, in order to avoid detection.

Further, concurrently with initiating the timer, TEE management engine 122 may start logging parameters/status of each of the components of system 100 to generate (e.g., compile) a running DTB. Alternatively or additionally, TEE management engine 122 may receive such a running DTB from another component of system 100. If TEE management engine 122 cannot receive or generate a running DTB before the timer is expired, TEE management engine 122 may determine that the timer is attacked (operation 206). Responsive to a determination that the timer is being attacked, TEE management engine 122 may take an according action, described with respect to operation 212 below.

If TEE management engine 122 can receive or generate a running DTB before the timer is expired, TEE management engine 122 may further determine whether the running DTB is the same as the golden copy of the DTB (operation 208). As described above, the determination whether the running DTB is the same as the golden copy may be made by comparing the running DTB with the golden copy. For example, the running DTB may be compared with the golden copy to determine if one or more parameters associated with the devices of the DTB have been changed, removed, or otherwise altered. If the running DTB is determined to be the same as the golden copy, the method 200 may proceed again to operation 204 to monitor the timer. If the running DTB is not the same as the golden copy, TEE management engine 122 may determine which of the parameters of the running DTB differ from the parameters of the golden copy of the DTB (operation 210).

The method 200 proceeds to operation 212 in which TEE management engine 122 relies on one or more predetermined policies to take according actions to the determined discrepancies. An exemplary policy is shown in Table I below.

TABLE I

| Device Node | Priority | Severity | Possible Action |
|---|---|---|---|
| Memory | 1 | 1 | Quarantine immediately |
| GPIO | 2 | 0 | Notify and evaluate |
| USB | 1 | 1 | Notify and ask to quarantine |

As shown in Table I, in response a determination that one or more parameters of the running DTB differ from corresponding parameters of the golden copy of the DTB, a user may be notified of an attack. In some embodiments, the user is notified via a user device. Examples of user devices include, but are not limited to, mobile phones, electronic tablets, laptops, desktop computers, workstations, and other types of electronic devices. In some embodiments, the user may be notified via display 112. In an example where one or more parameters associated with a USB device node in the running DTB are determined to be different than corresponding parameters in the golden copy (e.g., a determination that the USB device is under attack), TEE management engine 122 may generate and transmit a notification indicating the device node that is being attacked, a nature of the attack, and/or any other available information about the attack.

In some embodiments, a user may be presented with one or more options after receiving a notification. For example, the user may choose to evaluate or quarantine the affected device node, or may choose to halt operations of the system (e.g., system 100) or parts of the system. In some embodiments, TEE management engine 122 may automatically quarantine and/or evaluate the affected device node. As shown in Table I, for example, an affect GPIO device node may be evaluated by TEE management engine 122 to determine information about the attack such as the type of attack, how the attack might affect other nodes, parameters changed by the attack, etc. In another example, an affected memory device node may be immediately quarantined. In this example, the memory device node may be partitioned from the rest of the system, operations of the memory device node may be halted or limited, or another action may be taken that helps to prevent an attacker from accessing other system components or device nodes from the affect node.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method comprising:
retrieving a device tree binary from a system, wherein the device tree binary is a data structure describing one or more hardware components of the system at an initial boot stage of the system;
generating a golden copy of the device tree binary of the system, wherein the golden copy is a fixed known good copy of the device tree binary at the initial boot stage of the system;
storing the golden copy of the device tree binary of the system in a trusted execution environment in the system;
initiating a timer and determining whether a running copy of the device tree binary of the system is received or generated before the timer expires;
in response to a determination that the running copy of the device tree binary has been received before the timer expires or that the device tree binary has been generated before the timer expires, identifying whether one or more parameters of the running copy of the device tree binary of the system are different from corresponding parameters of the golden copy by comparing the running copy with the golden copy; and
performing a corrective action responsive to an indication that at least one of the one or more parameters of the running copy are different from the corresponding parameters of the golden copy.

2. The method of claim 1, wherein performing the corrective action includes at least one of:
quarantining a component of the system associated with the one or more parameters;
evaluating each of the one or more parameters of the running copy identified as different from the corresponding parameters of the golden copy; or
notifying a user of the system.

3. The method of claim 1, further comprising generating the running copy of the device tree binary on the system.

4. The method of claim 3, wherein generating the running copy of the device tree binary further comprises recording one or more parameters associated with one or more components of the system, wherein the one or more parameters are presented in a kernel pseudo file.

5. The method of claim 1, further comprising receiving the running copy of the device tree binary from a non-trusted execution environment of the system.

6. The method of claim 1, further comprising determining that the timer has been attacked based on an indication that the running copy of the device tree binary has not been generated or received before the timer expired.

7. A system for detecting an attack to an internet-of-things (IoT) enabled device, the system comprising:
one or more memory devices having instructions stored thereon that, when executed by one or more processors, cause the one or more processors to perform operations comprising:
loading an operating system in a trusted execution environment of a system, wherein at least part of the operating system is used as a root of trust;
retrieving a device tree binary of the system, wherein the device tree binary is a data structure describing one or more hardware components of the system at an initial boot stage of the system;
generating a golden copy of the device tree binary of the system, wherein the golden copy is a fixed known good copy of the device tree binary at the initial boot stage of the system;
storing the golden copy of the device tree binary of the system in the trusted execution environment;
initiating a timer and determining whether a running copy of the device tree binary of the system is received or generated before the timer expires;
in response to a determination that the running copy of the device tree binary has been received before the timer expires or that the device tree binary has been generated before the timer expires, identifying whether one or more parameters of the running copy of the device tree binary of the system are different from corresponding parameters of the golden copy by comparing the running copy with the golden copy; and performing a corrective action responsive to an indication that at least one of the one or more parameters of the running copy are different from the corresponding parameters of the golden copy.

8. The system of claim 7, the operations further comprising decrypting the device tree binary of the system.

9. The system of claim 7, wherein performing the corrective action includes at least one of:

quarantining a component of the system associated with the one or more parameters;

evaluating each of the one or more parameters of the running copy identified as different from the corresponding parameters of the golden copy; or notifying a user of the system.

10. The system of claim 7, the operations further comprising generating the running copy of the device tree binary on the system.

11. The system of claim 10, wherein generating the running copy of the device tree binary further comprises recording one or more parameters associated with one or more components of the system, wherein the one or more parameters are presented in a kernel pseudo file.

12. The system of claim 7, the operations further comprising receiving the running copy of the device tree binary from a non-trusted execution environment of the IoT enabled device.

13. The system of claim 7, the operations further comprising determining that the timer has been attacked based on an indication that the running copy of the device tree binary has not been generated or received before the timer expired.

14. A method comprising:

loading an operating system in a trusted execution environment of a system, wherein at least part of the operating system is used as a root of trust;

retrieving a device tree binary of the system, wherein the device tree binary is a data structure describing one or more hardware components of the system at an initial boot stage of the system;

generating a golden copy of the device tree binary of the system, wherein the golden copy is a fixed known good copy of the device tree binary at the initial boot stage of the system;

storing the golden copy of the device tree binary of the system in the trusted execution environment;

initiating a timer and determining whether a running copy of the device tree binary of the system is received or generated before the timer expires;

in response to a determination that the running copy of the device tree binary has been received before the timer expires or that the device tree binary has been generated before the timer expires, identifying whether one or more parameters of the running copy of the device tree binary of the system are different from corresponding parameters of the golden copy by comparing the running copy with the golden copy; and performing a corrective action responsive to an indication that at least one of the one or more parameters of the running copy are different from the corresponding parameters of the golden copy.

15. The method of claim 14, wherein performing the corrective action includes at least one of:

quarantining a component of the system associated with the one or more parameters;

evaluating each of the one or more parameters of the running copy identified as different from the corresponding parameters of the golden copy; or notifying a user of the system.

16. The method of claim 14, further comprising decrypting the device tree binary of the system, wherein the device tree binary is a data structure describing one or more hardware components of the system.

17. The method of claim 14, further comprising generating the running copy of the device tree binary on the system.

18. The method of claim 17, wherein generating the running copy of the device tree binary further comprises recording one or more parameters associated with one or more components of the system, wherein the one or more parameters are presented in a kernel pseudo file.

19. The method of claim 14, further comprising:

performing, based on the determination that the running copy is not received or generated before the timer expires, a corrective action.

* * * * *